(No Model.) 2 Sheets—Sheet 1.

W. S. BELDING.
CLAMP FOR ELECTRIC MOTORS.

No. 404,069. Patented May 28, 1889.

Witnesses:
Charles H. Robert.
A. C. Mehlhorn.

Inventor:
Warren S. Belding
by Cyrus Kehr
Atty.

(No Model.) 2 Sheets—Sheet 2.

W. S. BELDING.
CLAMP FOR ELECTRIC MOTORS.

No. 404,069. Patented May 28, 1889.

Witnesses:
Charles H. Roberts
A. C. Mehlhorn

Inventor:
Warren S. Belding
by Cyrus K E Lu.
Atty.

UNITED STATES PATENT OFFICE.

WARREN S. BELDING, OF CHICAGO, ILLINOIS, ASSIGNOR TO THE BELDING MOTOR AND MANUFACTURING COMPANY, OF SAME PLACE.

CLAMP FOR ELECTRIC MOTORS.

SPECIFICATION forming part of Letters Patent No. 404,069, dated May 28, 1889.

Application filed March 22, 1888. Serial No. 268,065. (No model.)

*To all whom it may concern:*

Be it known that I, WARREN S. BELDING, a citizen of the United States, residing at Chicago, in the county of Cook and State of Illinois, have invented certain new and useful Improvements in Clamps for Electric Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide means for securing electric motors to tables and shelves.

Figure 1:
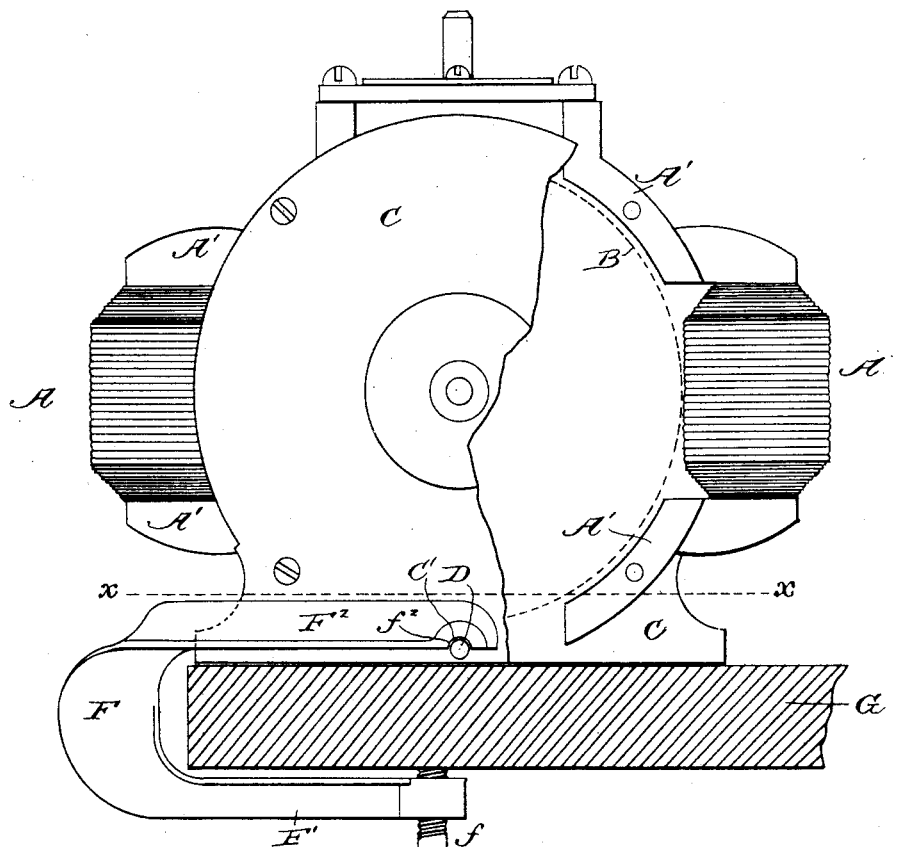
Figure 2:
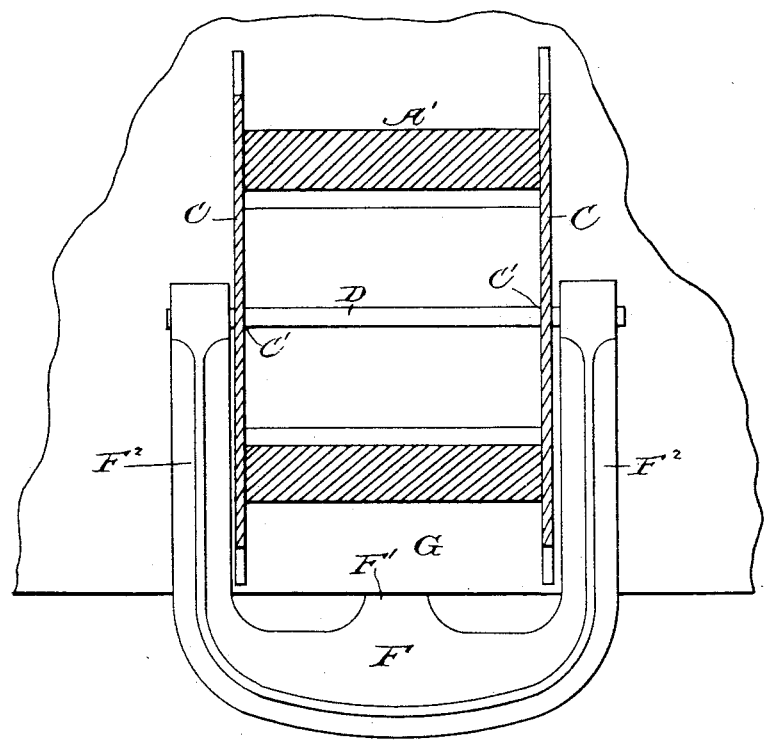

In the accompanying drawings, Figure 1 is a side view of said motor. Fig. 2 is a section in line $x$ $x$ of Fig. 1.

A A are the field-magnet coils, and A' A' are the poles of the field-magnets. These are located on opposite sides of the axis of the motor at such distance from each other as to leave room for the armature, the outer limit of which is shown by the dotted line B, Fig. 1.

C C are circular plates standing at right angles to the axis of the motor and screwed to the poles A'. The lower edges of each plate C are straight, and together constitute the base of the motor.

Below the space in which the armature rotates a rod or bar, D, extends horizontally through the plates C C, near the middle of the base of the latter, and projects outwardly a short distance from each of said plates. Said rod is combined with said plates in a simple manner—namely, by drilling a hole, C', of proper size through each plate and driving the rod through said holes. The rod requires no work to prepare it for its place. It only needs to be cut to the proper length.

F is the clamp, and G is a section of the table.

F' is the lower arm of the clamp and bears the screw $f$.

$F^2$ $F^2$ are the upper arms of the clamp. These are separated sufficiently to receive the base of the motor between them. The inner ends of said arms lie over the ends of the rod D. Said ends of the arms have notches $f^2$ in their lower face, in which the ends of the rod D lie. Tightening the screw $f$ draws the arms $F^2$ downwardly upon the ends of the rod D, and through the latter draws the motor tightly to the table. The field-magnets and the plates C C constitute the frame of the motor, and the rod D extends through said frame. It will be readily seen that said rod may be thus applied to motor-frames made in other forms.

I claim as my invention—

1. The combination, with an electric motor, of a rod, D, extending through the lower portion of the frame of the motor, the ends of said rod projecting at each side of the frame, and a clamp, F, to engage the ends of said rod D and a table, substantially as shown and described.

2. The combination, with an electric motor having the field-magnets A A' and plates C C, secured to said magnets, substantially as described, of a rod, D, extending horizontally through said plates C C and having its ends projecting from said plates, and a clamp, F, to engage said rod D and a table, substantially as shown and described.

In testimony whereof I affix my signature in presence of two witnesses.

WARREN S. BELDING.

Witnesses:
CYRUS KEHR,
CHARLES H. ROBERTS.